United States Patent [19]
Mishina

[11] Patent Number: 5,292,153
[45] Date of Patent: Mar. 8, 1994

[54] SEAT BELT RETRACTOR

[75] Inventor: Jyoji Mishina, Shiga, Japan

[73] Assignee: Takata Corporation, Tokyo, Japan

[21] Appl. No.: 913,400

[22] Filed: Jul. 15, 1992

[30] Foreign Application Priority Data

Jul. 24, 1991 [JP] Japan .................................. 3-184675

[51] Int. Cl.$^5$ ............................................ B60R 22/34
[52] U.S. Cl. ...................................... 280/807; 242/107
[58] Field of Search ................ 242/107; 280/801, 806, 280/807, 808, 801 R; 297/475

[56] References Cited

U.S. PATENT DOCUMENTS

| | | | | |
|---|---|---|---|---|
| 4,452,470 | 6/1984 | Doty | .................. | 280/807 |
| 4,461,493 | 7/1984 | Doty | .................. | 280/807 |
| 4,881,423 | 11/1989 | Troiano | .................. | 280/807 |

*Primary Examiner*—Margaret A. Focarino
*Assistant Examiner*—Paul Dickson
*Attorney, Agent, or Firm*—Kanesaka and Takeuchi

[57] ABSTRACT

A seat belt retractor for an automobile comprises a reel for retracting a seat belt around the same, a frame for holding the reel in a rotatable manner, and a spring for biasing the reel in the direction of retracting the belt. The spring is consisted of a main spring for normally biasing the reel in the direction of retracting the belt and an auxiliary spring for producing, in the direction of retracting the belt, biasing force that is applied to the reel in an off-and-on way by an off-and-on unit, the main spring and the auxiliary spring being disposed in parallel. The device includes a unit for detecting an open/closed state of a door at the side of a seat on which the seat belt is fastened, and the off-and-on unit interrupts transmission of the biasing force in the direction of retracting the belt from the auxiliary spring to the reel when the door open/closed state detecting unit detects the closed state of the door.

8 Claims, 12 Drawing Sheets

SEAT BELT RETRACTOR

FIELD OF THE INVENTION

The present invention relates to an improvement in a seat belt retractor equipped on motor vehicles such as automobiles, and more particularly to a novel seat belt retractor which will not press the occupant (i.e., a driver or a passenger) with a force more than necessary when a seat belt is in a properly withdrawn state.

DESCRIPTION OF THE RELATED ART

Seat belts (hereinafter referred to simply as belts sometimes) equipped in automobiles and the like are desirably arranged not to press the occupant with a force more than necessary in a normally fitted state after a driver or a passenger sits on the seat and fastens a belt and then an excessive slack of the belt is completely absorbed.

Because biasing force of a belt retracting spring is utilized to produce retracting pressure, the following contradictory conditions would take place unless a spring unit is designed with special cares:

(a) If a spring with relatively weak biasing force were used to reduce pressing force in the normally fitted state, the retracting pressure would become weak correspondingly; and (b) If a spring with strong biasing force were used to keep the sufficient retracting pressure, the pressing force would be too large in the normally fitted state.

To solve the above contradictory conditions, there has been proposed such a device that spring means for applying the biasing force in the retracting direction to the belt comprises a main spring and an auxiliary spring, the retracting pressure is produced due to the combined biasing forces of both the springs to keep the sufficient retracting force in a state of usually retracting the belt, and further only the biasing force of the main spring is utilized to make the seat belt lightly fit over the body of the occupant in the normally fitted state (see Japanese Utility Model Application No. 61-146473 and Japanese Patent Application No. 62-297467).

FIGS. 5 to 11 show an entire exploded perspective view of a belt retractor according to Japanese Utility Model Application No. 61-146473, an enlarged perspective view of an idler gear, a front view of the retractor in an assembled state, and a sectional view taken along line VIII—VIII.

Figure 5:
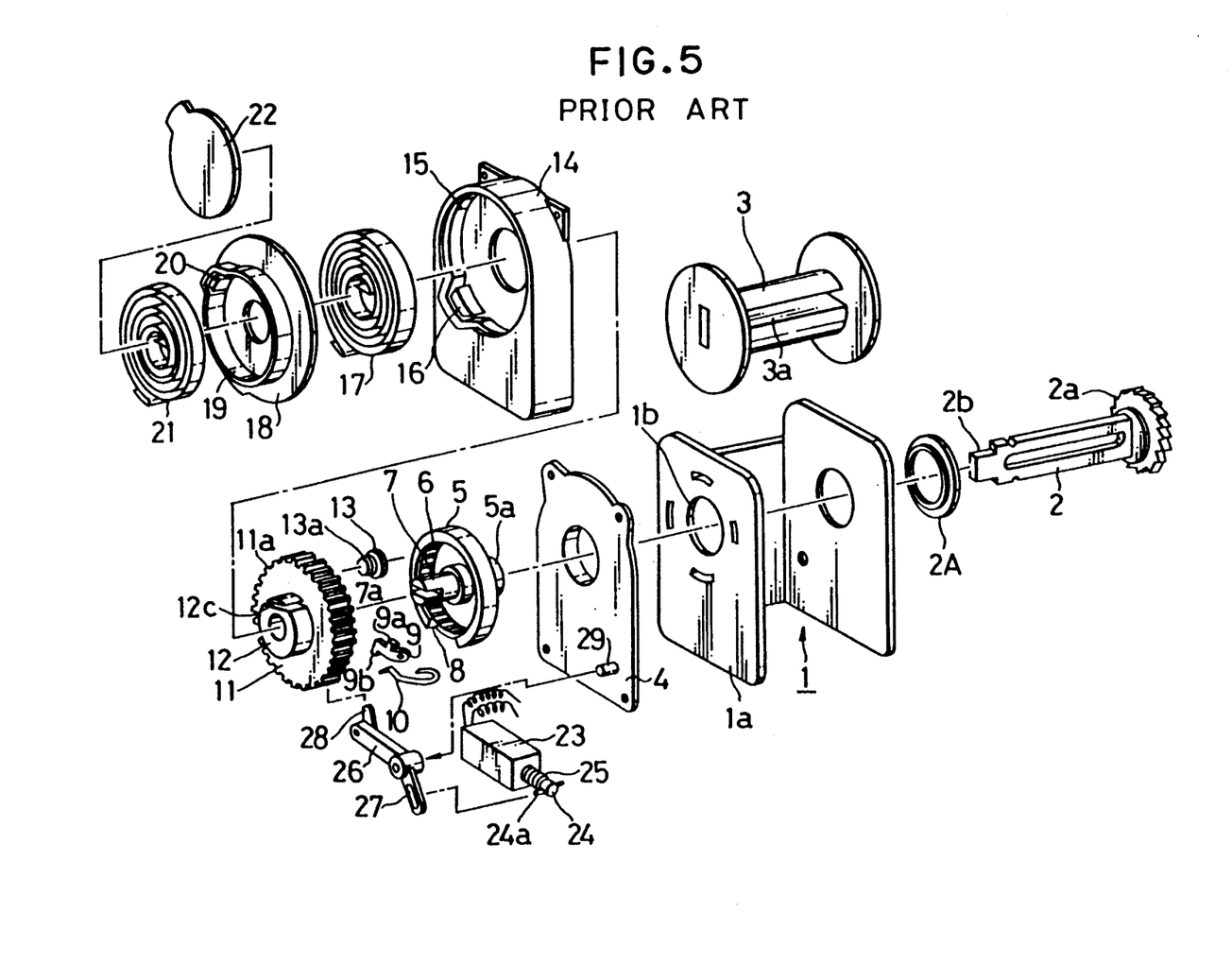
FIG. 5 is an entire exploded perspective view of a belt retractor according to one prior art.

In these drawings, denoted by reference numeral 1 is a frame of the belt retractor which has a channel-like shape in section and comprises a pair of side walls 1a, one of the side walls being provided with a bearing portion 1b. 2 is a main shaft penetrating through openings of both the frame 1 and a later-described retainer 4. The main shaft 2 has one end to which is fixed a ratchet wheel 2a of an emergency lock unit (not shown) of the well-known structure per se, and the other end which is formed into a rectangular shaft 2b engaging a gear wheel 5 for corotation therewith. 2A is a slide washer.

Denoted by 3 is a belt reel assembled on the main shaft 2 for corotation therewith between the side walls 1a of the frame 1, the belt reel having in its core portion a structure 3a adapted to hold the inner end of a belt "B". 4 is a retainer fixed to the bearing portion 1b of the frame 1 by any appropriate means and having a circular opening in which a boss 5a of the gear wheel 5 is rotatably supported. The boss 5a is held in engagement with the rectangular shaft 2b of the main shaft.

The gear wheel 5 engaging the rectangular shaft 2b for corotation with the main shaft 2 has in its inner peripheral surface internal teeth 6 held in mesh with an idler gear 13, and is provided with a subshaft 7 at the center thereof. The subshaft 7 includes a lock portion 7a in the form of a diametrical groove to hold the inner end of a main spring 21. Further, the gear wheel 5 is formed in the left end face as viewed on FIG. 5 with a notch 8 for accommodating a hook 9. The hook 9 rotatably supported at its one end in the notch 8 has midway in its arm portion a projection 9a engageable with a projection 13a of an idler gear 13, and is provided at its forward end with a lock portion 9b for locking a projection 11b on the inner peripheral surface of a gear carrier 11. The hook 9 is normally biased by a spring 10 secured to the gear wheel 5 so as to turn in a direction toward the center of the gear wheel 5 (i.e., clockwise).

Denoted by 11 is a gear carrier rotatably fitted over the subshaft 7 of the gear wheel 5. The gear carrier 11 is provided in the outer peripheral surface with teeth 11a engageable with a pawl 28 (hereinafter referred to as a clutch pawl or a swing pawl sometimes) of a later-described pivot level 26, and has a projection 11b engaging the lock portion 9b of the hook in the inner peripheral surface of a circular recess formed on the side facing the frame 1. A shaft 11c for supporting the idler gear 13 is provided on the end face of the circular recess. Further, a boss 12 is formed at the center of the gear carrier on the opposite side, and the boss 12 has a lock portion 12c in the form of chordal groove for holding the inner end of the auxiliary spring 17.

Figure 6:
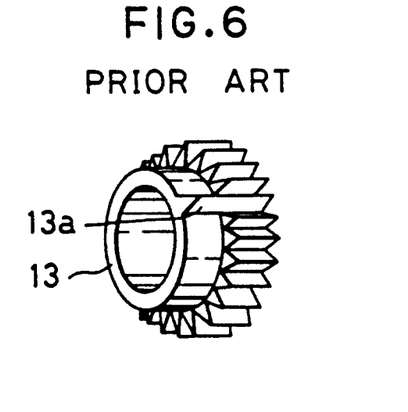
FIG. 6 is an enlarged perspective view of an idler gear in the device of FIG. 5.

The idler gear 13 supported to the shaft 11c of the gear carrier 11 is held in mesh with the internal teeth 6 of the gear wheel 5, and is provided in part of the outer periphery with the projection 13a engageable with the projection 9a of the hook as shown in FIG. 6 (enlarged perspective view). With the clutch action due to rotation itself, the idler gear 13 connects the wheel 5 and the carrier 11 in a disconnectable manner.

The positional relationship between both the projections 9a and 13a are set as follows. When the projection 13a on the idler gear side comes into engagement with the projection 9a on the hook side, the idler-side projection 13a pushes the hook-side projection 9a to rotate the hook 9 counterclockwise in FIG. 7, so that the lock portion 9b at the forward end of the hook is engaged with the projection 11b of the gear carrier to thereby prevent relative rotation between the gear wheel 5 and the gear carrier 11. On the contrary, upon the idler-side projection 13a being disengaged from the hook-side projection 9a, the locked condition between the gear wheel 5 and the gear carrier 11 is released.

Figure 7:
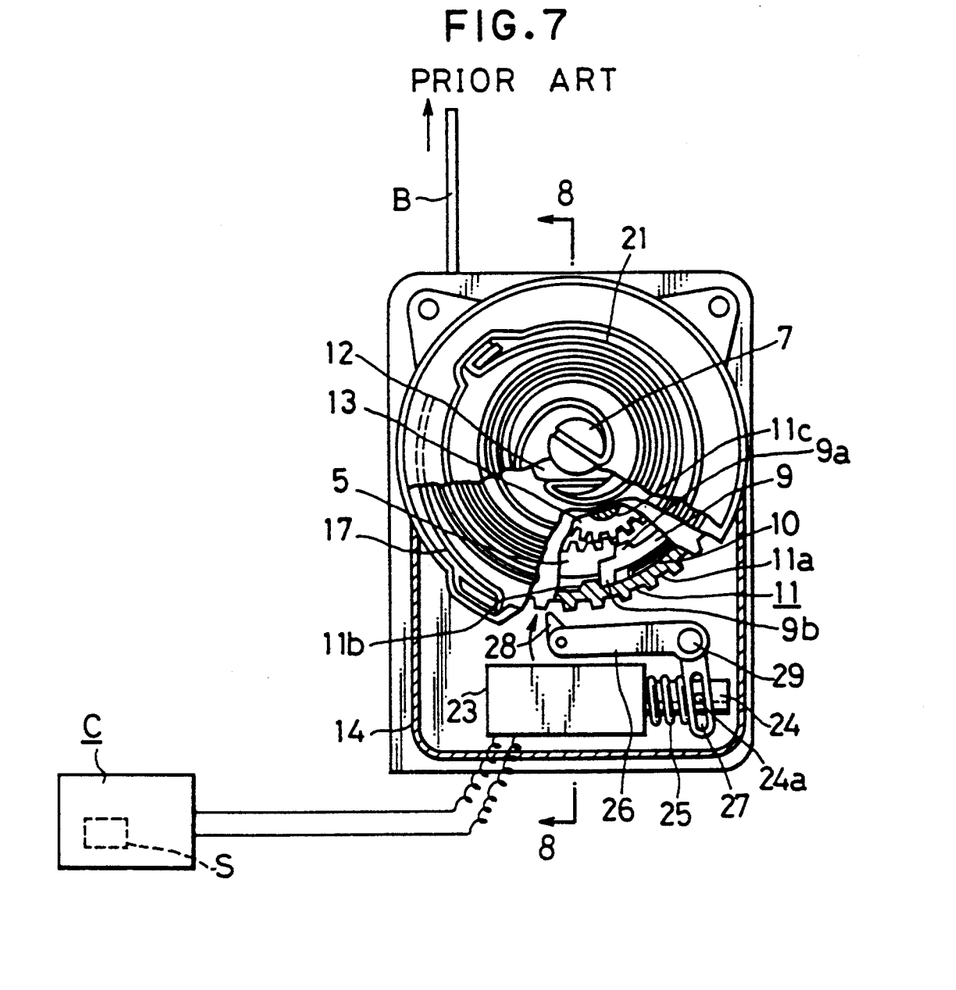
FIG. 7 is a front view of the retractor of FIG. 5 in an assembled state with a cap 22 omitted, the view being partially broken away to show the internal structure.
Figure 8:
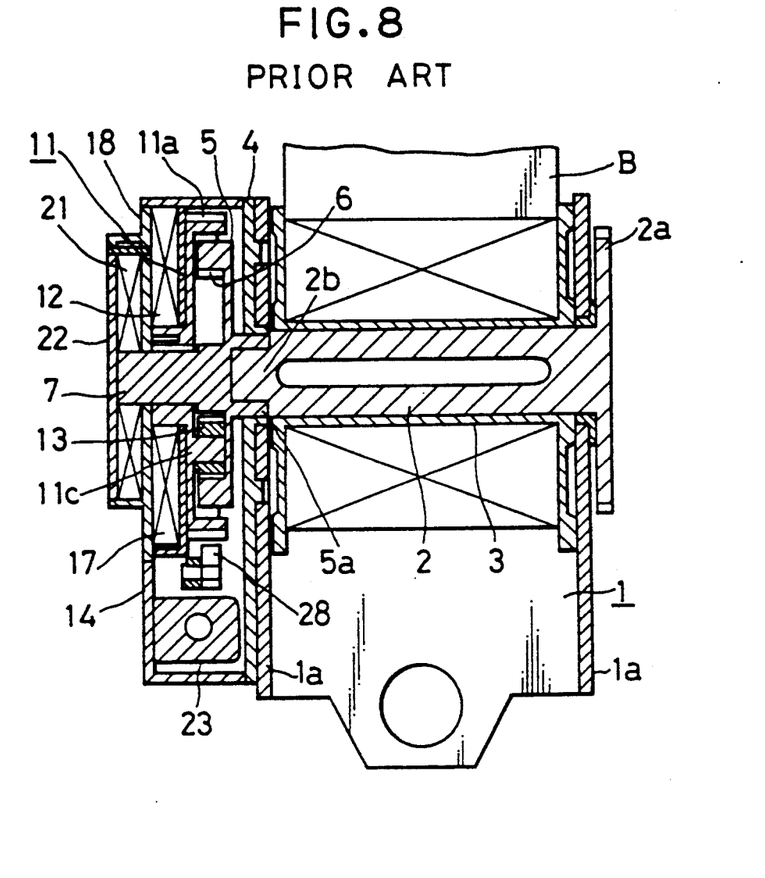
FIG. 8 is a sectional view taken along line 8—8 in FIG. 7.
Figure 9:
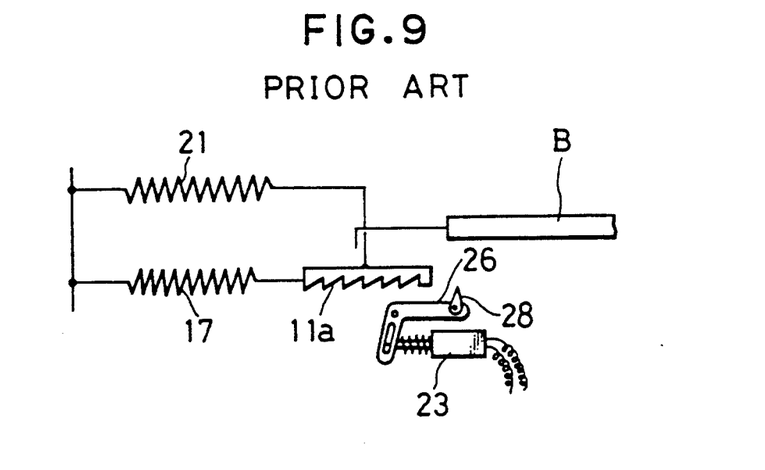
FIG. 9 is a conceptual view showing a state where a seat belt is retracted in a storage chamber, for explaining the operation principles of the device of FIG. 5.

Denoted by 14 is a cover attached to the frame side wall 1a together with the retainer 4. The cover 14 has on its left side, as viewed on FIG. 5, a circular storage chamber 15 for accommodating both the auxiliary spring 17 and a housing 18 for the main spring therein, and also has on the opposite side, as shown in FIG. 7, a storage portion for an electromagnetic solenoid 23 and a shaft 29 for rotatably supporting the pivot lever 26. The housing 18 houses the main spring 21 in its storage chamber 19, and serves also to cover the auxiliary spring 17 at its right end face. 22 is a cap fitted and fixed to the storage chamber 19 of the housing 18 with an additional function of preventing slip-off of the main spring 21.

The auxiliary spring 17 has its outer end locked to a spring holder 16 provided in the inner peripheral surface of the circular storage chamber 15, and its inner end locked to the boss 12 of the gear carrier 11, thereby normally biasing the gear carrier 11 in the direction of retracting of the belt.

The main spring 21 has its outer end locked to a lock portion 20 provided in the inner peripheral surface of the storage chamber 19, and its inner end locked to the subshaft 7 of the gear wheel 5, thereby normally biasing the belt "B" in the direction of retracting of the belt.

Denoted by "C" in FIG. 7 is a coupled state detecting circuit which detects whether or not a tongue of the belt "B" and a buckle member on the buckle stalk side (both members not shown) are in a normally coupled state. When the tongue and the buckle member are normally coupled with each other, the circuit "C" outputs an electric detection signal. For example, when the tongue is inserted into the buckle member and pushes a switch "S" previously installed in the buckle member for turning it on, the circuit "C" outputs a signal indicative of such a normally coupled state.

Denoted by 23 in FIG. 7 is an electromagnetic solenoid diposed in the storage portion on the opposite side of the cover 14, the electromagnetic solenoid comprising a plunger 24 and a spring 25 for pressing the plunger 24 into a projected position. While the coupled state detecting circuit "C" is outputting the detection signal, the electromagnetic solenoid is kept energized.

Denoted by 26 in FIG. 7 is a pivot lever rotatably supported at its intermediate portion by a shaft 29 of the cover 14. The pivot lever 26 has at its forward and a swing pawl 28 rotatable only counterclockwise. The lever 26 also has a slit 27 formed in its downward arm. The pivot lever 26 and the electromagnetic solenoid 23 are interconnected for cooperation by an interlock pin 24a provided on the plunger 24 to penetrate through the slit 27.

The operating relationship among the swing rawl 28 of the pivot lever 26, the electromagnetic solenoid 23 and the teeth 11a of the gear carrier 11 is set as described below:

(i) When the electromagnetic solenoid 23 is de-energized, the plunger 24 is protruded under the pressing action of the spring 25 so that the pivot lever 26 is kept stopped at a position where the swing pawl 28 is out of mesh with the teeth 11a of the gear carrier 11.

(ii) When the electromagnetic solenoid 23 is energized, the plunger 24 is retracted to turn the pivot lever 26 into a position where the swing pawl 28 meshes with the teeth 11a.

Operation of the prior device shown in FIGS. 5 to 11 and constructed as explained above will be next described.

(1) State where belt is stowed

In this state, because the tongue of the belt "B" and the buckle member are not coupled with each other, the electromagnetic solenoid 23 is kept de-energized. Accordingly, the plunger 24 is protruded under the pressing action of the spring 25 so that the pivot lever 26 is kept stopped at a position where the swing pawl 28 of the pivot lever 26 is out of mesh with the teeth 11a of the gear carrier 11. Stated otherwise, the gear carrier 11 is freely rotatable and three members, i.e., the subshaft 7, the main shaft 2 and the belt reel 3 (hereinafter referred to collectively as the main shaft 2, etc.), are brought into a condition that the belt can be retracted by the combined biasing forces of the main spring 21 and the auxiliary spring 17 (see FIGS. 7 and 11).

In this state, however, the projection 13a of the idler gear 13 is engaged with the projection 9a of the hook 9 to turn the lock portion 9b at the forward end of the hook 9 outwardly. Accordingly, even if the main shaft 2, etc. are in a condition that it can retract the belt "B", the lock portion 9b is engaged with the projection 11b on the inner peripheral surface of the gear carrier 11 to prevent the gear carrier 11 from rotating in the direction of retracting of the belt.

Thus, the belt "B" is totally held retracted around the reel 3.

(2) State where belt is withdrawn for fastening

When the occupant withdraws the belt "B" for fastening it, the main shaft 2, etc. are rotated in the direction of withdrawal of the belt correspondingly and, therefore, both the gear wheel 5 and the gear carrier 11 interconnected by the hook 9 are also rotated in the withdrawal direction (clockwise in FIG. 7), thereby more tightly rolling up the main spring 21 and the auxiliary spring 17.

When the occupant couples the tongue of the belt "B" and the buckle member in the above condition, the switch "S" inside the buckle member is turned on to energize the electromagnetic solenoid 23, whereby the plunger 24 is retracted to turn the pivot lever 26 about the shaft 29 clockwise in FIG. 7. As a result, the swing pawl 28 comes into mesh with the teeth 11a of the gear carrier 11 for locking the rotation of the gear carrier 11 in the direction of retracting of the belt.

Figure 10:
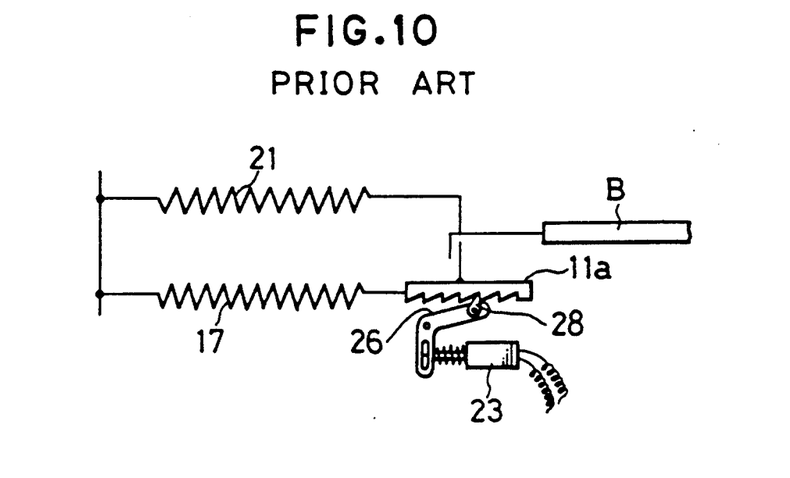
FIG. 10 is a conceptual view showing a state where a seat belt is withdrawn and its tongue is coupled with a buckle member, for explaining the operation principles of the device of FIG. 5.
Figure 11:
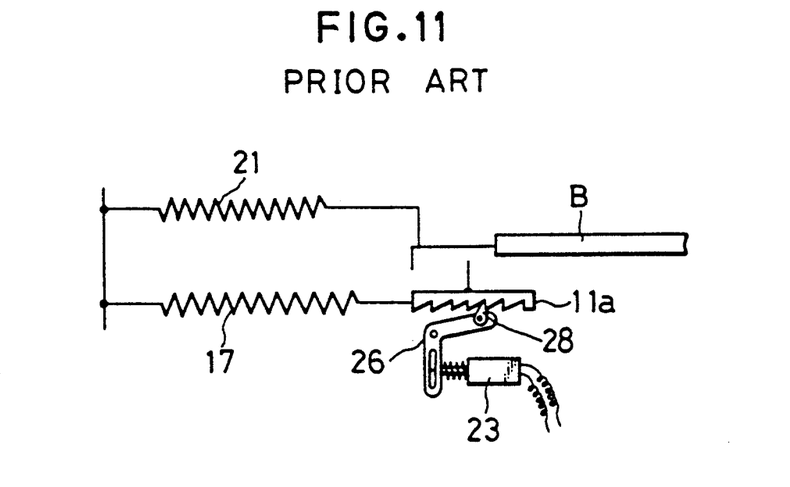
FIG. 11 is a conceptual view showing a state where after coupling between the tongue and the buckle member, the excessively withdrawn belt is somewhat rewound to fit over the body of the occupant, for explaining the operation principles of the device of FIG. 5.

Therefore, the biasing force of the auxiliary spring 17 in the retracting direction is no longer transmitted to the gear wheel 5 (namely, the main shaft 2) and the belt "B" is given the biasing force of only the main spring 21 (see FIG. 10).

(3) State where belt is released from hands after coupling tongue and buckle member When the belt "B" excessively drawn out for coupling the tongue and the buckle member is released from the hands, the belt "B" is rewound by only the biasing force of the main spring 21 until fitting over the body of the occupant.

More specifically, under the condition of FIG. 10, the idler gear 13 held in mesh with the internal teeth 6 of the gear wheel 5 is allowed to rotate about its own shaft 11c. Accordingly, when the gear wheel 5 and the reel 2 are both rotated for rewinding the excessively withdrawn portion of the belt "B", the idler gear 13 is rotated about its own shaft correspondingly so that the engagement between the projection 13a of the idler gear 13 and the projection 9a of the hook 9 are released.

Therefore, the hook 9 is sunk into the notch 8 by the biasing force of the spring 10 to release the projection 11b of the gear carrier 11 from its locked state by the hook 9, whereby the relationship between the gear wheel 5 and the gear carrier 11 is shifted into a condition allowing the wheel 5 and the carrier 11 to rotate independently of each other. As a result, the gear wheel 5 is freely rotated together with the main shaft 2, etc. to rewind the belt until it fits over the body of the occupant (see FIG. 11).

In this state, since only the biasing force of the main spring 21 is applied to the body of the occupant, the pressing that the occupant may feel can be remarkably lessened.

(4) State where the occupant moves into forwardly inclined posture after fastening belt When the occupant's posture is shifted from a normally seated posture to a forwardly inclined posture, the belt "B" is withdrawn correspondingly. At this time, until the excessive amount of belt that has been rewound after fastening the belt as mentioned above is withdrawn, the main shaft 2, etc. are rotated together with the gear wheel 5 while more tightly rolling up only the main spring 21. During this course, the idler gear 13 held in mesh with the internal teeth 6 of the gear wheel 5 continues rotating about its own shaft 11c.

Then, at the time the excessive amount of belt rewound is fully withdrawn, the projection 13a of the idler gear 13 comes into engagement with the projection 9a of the hook 9 so that the hook 9 is pushed up for releasing against the biasing force of the spring 10 and stopped at the pushed-up position. Therefore, the lock portion 9b at the forward end of the hook 9 comes into engagement with the projection 11b of the gear carrier 11, whereupon the gear carrier 11 is locked to the gear wheel 5. Consequently, when the belt "B" is withdrawn beyond the time at which the excessive amount of belt rewound has been fully withdrawn, the gear wheel 5 and the gear carrier 11 are both rotated together and, since then, the belt "B" is withdrawn while more tightly rolling up the main spring 21 and the auxiliary spring 17.

Note that, at this time, although the swing pawl 28 of the pivot lever 26 and the teeth 11a of the gear carrier 11 are in engagement with each other, the swing pawl 28 of the pivot lever 26 is itself supported to be rotatable only counterclockwise and thus the rotation of gear carrier 11 in the clockwise direction (i.e., the direction of withdrawal of the belt) will not be prevented.

(5) State where the occupant returns to normally seated posture after forwardly inclined posture When the occupant returns to a normally seated posture after taking a forwardly inclined posture, the belt "B" is retracted by only the biasing force of the main spring 21. The reason is the same as that explained before in connection with (3) "State where belt is released from hands after coupling tongue and buckle member".

Thus, in this state, the rotation of the gear carrier 11 in the counterclockwise direction (i.e., the direction of retracting of the belt) is prevented by the swing pawl 28 so that the retracting force of the auxiliary spring 17 will not be transmitted to the belt reel 3.

(6) State where tongue and buckle member are decoupled for alighting

When the coupling between the tongue and the buckle member is released, the switch "S" inside the buckle member is turned off to bring the electromagnetic solenoid 23 into a de-energized state. Therefore, the plunger 24 is returned to its protruded position under the pressing force of the spring 25 to turn the pivot lever 26 counterclockwise, thereby releasing the engagement between the swing pawl 28 and the teeth 11a of the gear carrier 11. As a result, the gear carrier 11 comes into a condition that it can rotate counterclockwise (i.e., in the retracting direction) by the biasing force of the auxiliary spring 17.

Meanwhile, the idler gear 13 held in mesh with the internal teeth 6 continues rotating about its own shaft until the projection 13a of the idler gear 13 comes into engagement with the projection 9a of the hook 9, thereby completing the interconnection between the gear wheel 5 and the gear carrier 11. Therefore, the wheel 5 and the carrier 11 are now rotated together by the combined biasing forces of the main spring 21 and the auxiliary spring 17 to fully retract the belt "B" around the reel 3. Note that the idler gear 13 stops rotation about its own axis after coupling between both the members 5 and 11.

Figure 12:
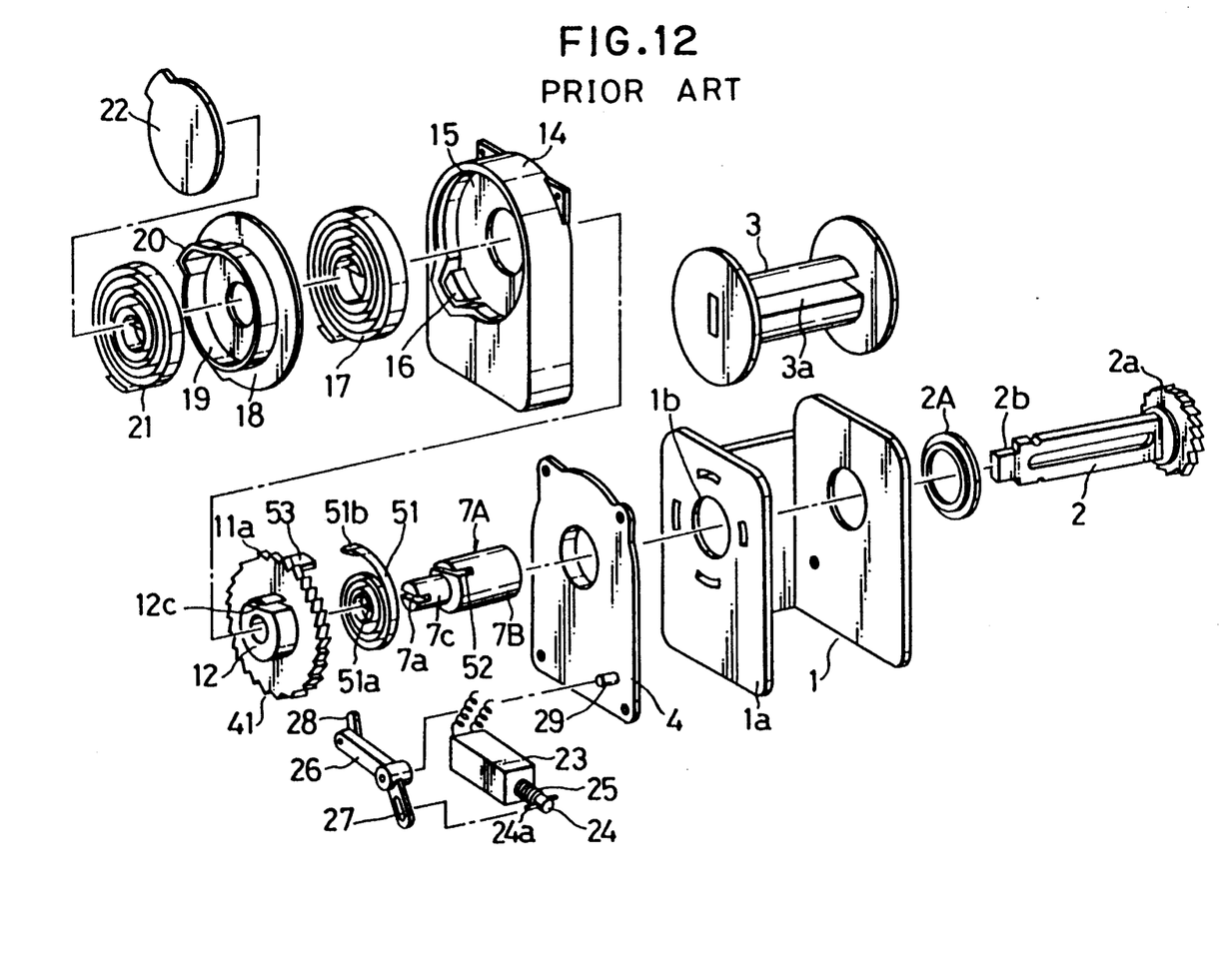
FIG. 12 is an entire exploded perspective view of a seat belt retractor according to another prior art.
Figure 13:
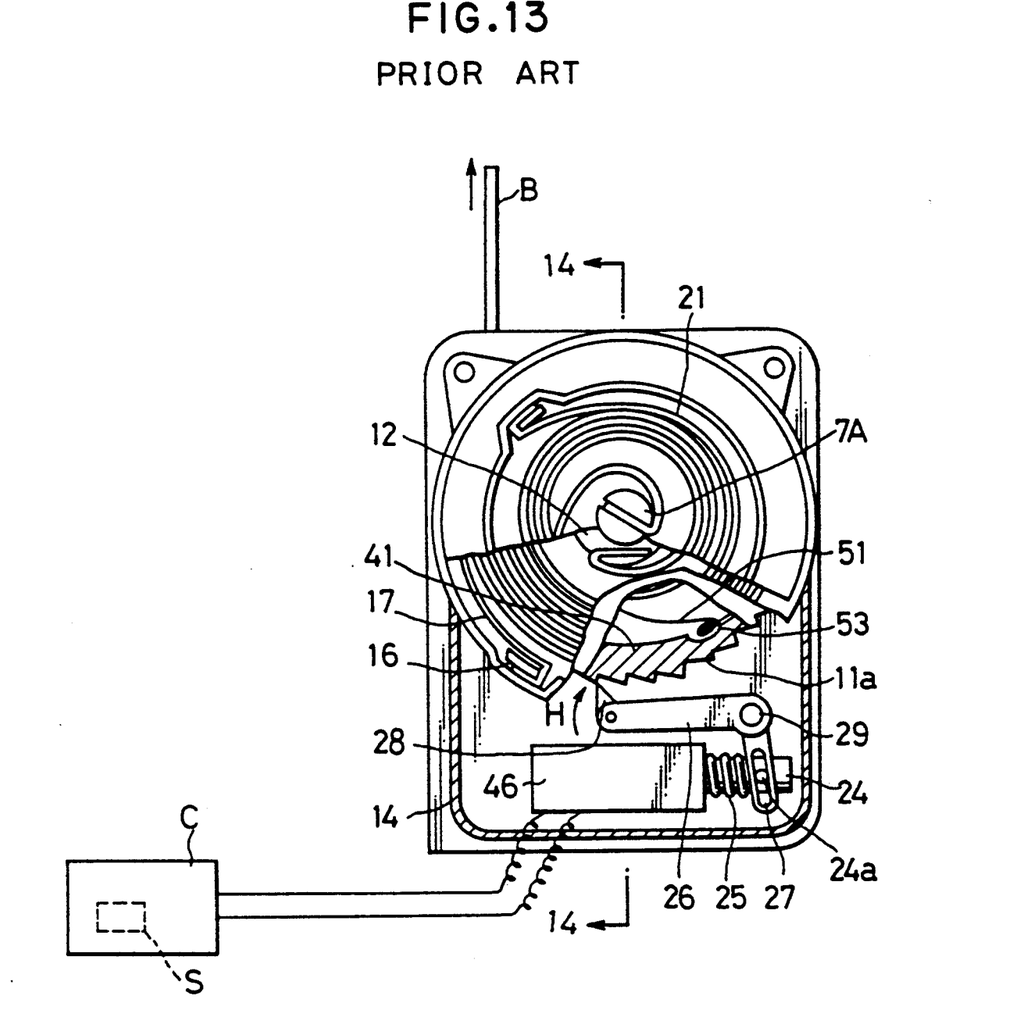
FIG. 13 is a front view of the retractor of FIG. 12 in an assembled state.
Figure 14:
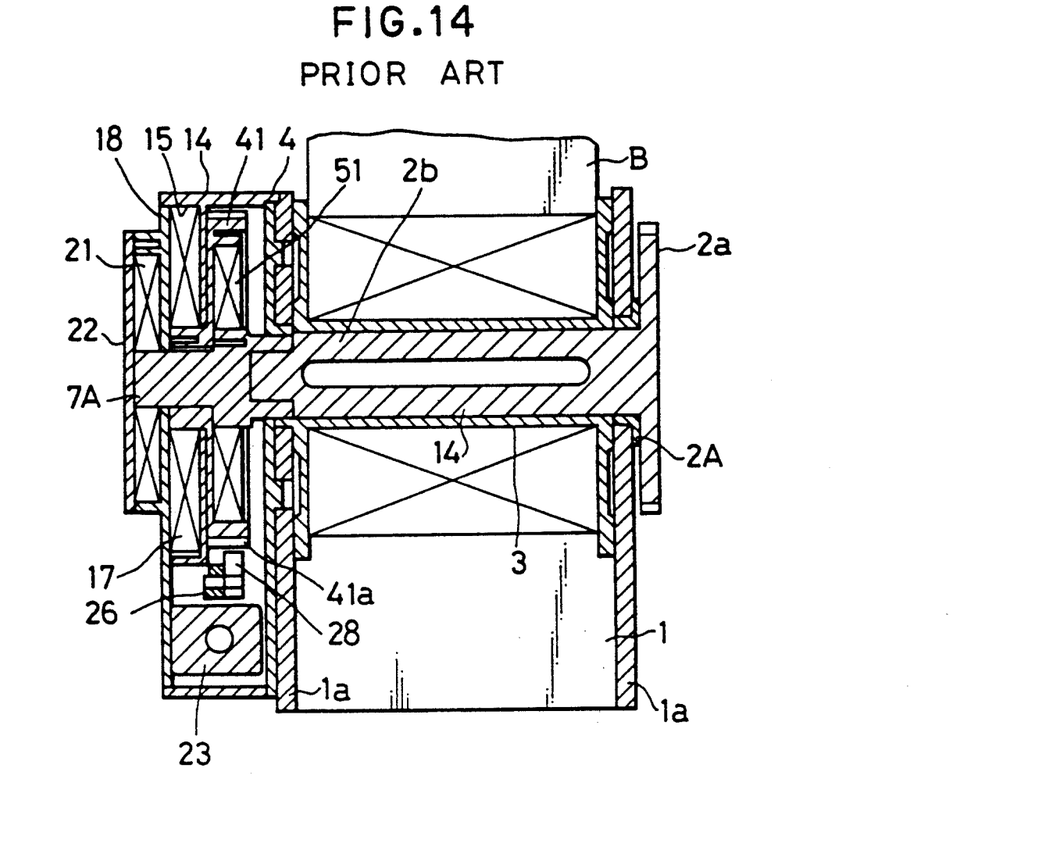
FIG. 14 is a sectional view taken along line 14—14 in FIG. 13.
Figure 15:
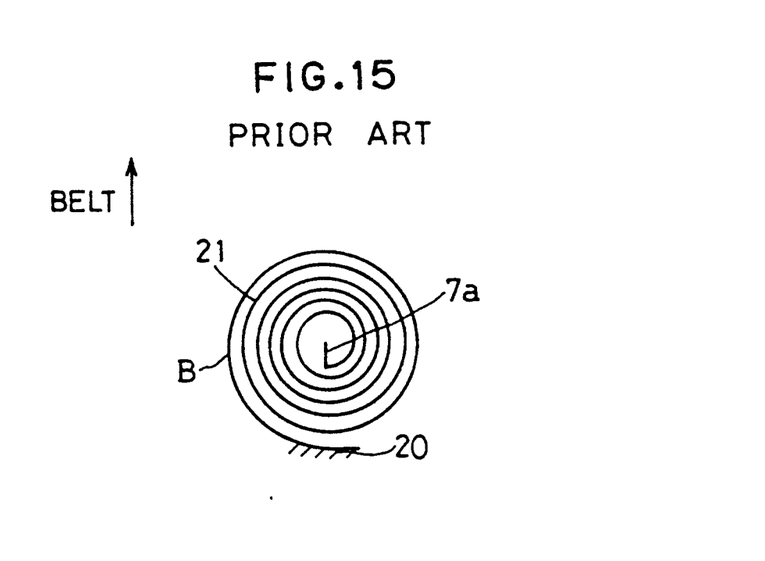
FIG. 15 is a view showing the positional relationship between a coupling shaft (or a subshaft) and a main spring relative to the directions of withdrawal and retraction of the seat belt.
Figure 16:
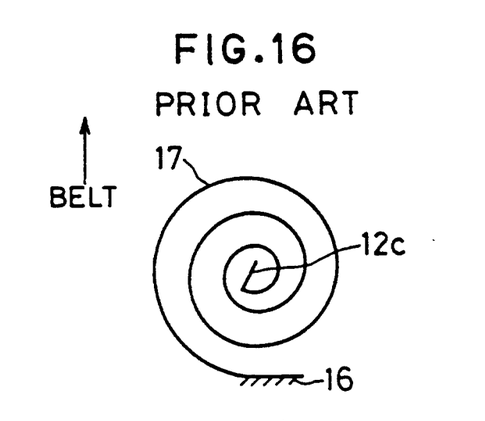
FIG. 16 is a view showing the positional relationship between a clutch gear and an auxiliary spring relative to the directions of withdrawal and retraction of the seat belt.
Figure 17:
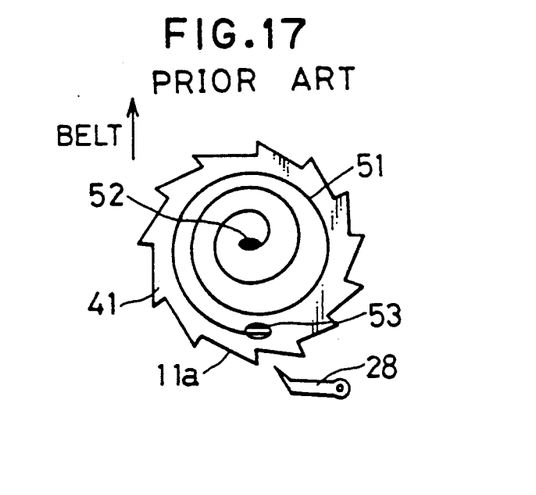
FIG. 17 is a view showing the positional relationship between teeth of the clutch gear, a clutch pawl and a withdrawal adjusting tape relative to the directions of withdrawal and retraction of the seat belt.

FIG. 12 is an entire exploded perspective view of a seat belt retractor according to Japanese Patent Application No. 62-297467, FIG. 13 is a front view of the retractor in an assembled state, FIG. 14 is a sectional view taken along line Y—Y in FIG. 13, and FIGS. 15 to 17 are views showing the positional relationship between the respective members relative to the directions of withdrawal and retraction of the seat belt.

In the device of Japanese Patent Application No. 62-297467, a clutch gear 41 is used instead of the gear carrier 11. As with the gear carrier 11, the clutch gear 41 has a boss 12 provided with a lock portion 12c, and also has teeth 11a on its outer peripheral surface. A tape outer end holder 53 in the form of a projection is provided on the clutch gear 41 on the side opposite to the boss 12 at a location near the outer peripheral edge.

Also, in this prior device, a subshaft 7A is provided instead of the gear wheel 5 with the subshaft 7. The subshaft 7A has a rectangular hole (not shown) bored in the right end face, as viewed on FIG. 12, and the rectangular shaft 2b of the main shaft 2 is fitted in the rectangular hole. The subshaft 7A comprises a larger-diameter portion 7B and a smaller-diameter portion 7C on the left side of the former, as viewed on FIG. 12. A lock portion 7a for locking the auxiliary spring 17 is provided at the distal end face of the smaller-diameter portion 7C. The smaller-diameter portion 7C is slidably inserted to a center hole of the clutch gear 41.

A withdrawal adjusting tape 51 is retracted around the outer periphery of a portion corresponding to the boundary between the larger-diameter portion 7B and a smaller-diameter portion 7C. The tape 51 has its outer end locked to the tape outer end holder 53 of the clutch gear 41, and its inner end locked to a tape inner end holder 52 in the form of a chordal groove bored in the larger-diameter portion 7B.

The remaining construction is the same as that of the above-stated device of Japanese Utility Model Application No. 61-146473 and thus will not be described again except for denoting the same parts at the same reference numerals.

Operation of the prior retractor thus constructed will be next described.

(1) State where belt is stowed

The subshaft 7A always subjected to the biasing force of the main spring 21 is rotated counterclockwise by the biasing force of the main spring 21 to rotate the belt reel 3 through the main shaft 2 in the same direction. Therefore, the seat belt "B" decoupled from the buckle member is in a condition that it can be retracted around the belt reel 16. At this time, the withdrawal adjusting tape 51 with its one end fixed to the tape inner end holder 52 of the subshaft 7A is more loosely rolled upon the counterclockwise rotation of the subshaft 7A.

Figure 18:
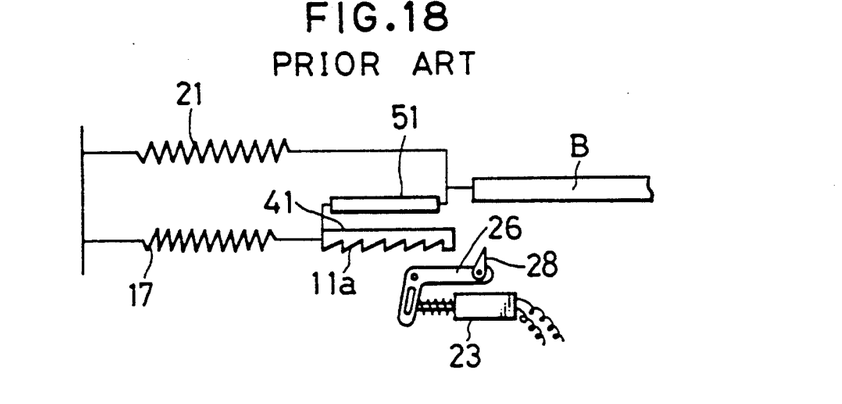
FIG. 18 is a conceptual view showing a state where a seat belt is retracted in a storage chamber, for explaining the operation principles of the device of FIG. 12.

However, when the seat belt "B" and the buckle member are decoupled from each other, the electromagnetic solenoid 23 is de-energized to keep the plunger 24 at its protruded position by the pressing force of the return spring 25. In this state, accordingly, the pivot lever 26 remains at a position where the clutch pawl 28 of the pivot lever 26 is out of mesh with the teeth 11a of the clutch gear 41. As a result, the clutch gear 41 is rotated counterclockwise by the biasing force of the auxiliary spring 17 and, during this rotation, it absorbs the above-mentioned slack of the withdrawal adjusting tape 51. Thus, the withdrawal adjusting tape 51 is closely wound around the outer periphery of the subshaft 7A and finally brought into a tight condition between the shaft outer periphery and the tape outer end holder 53 of the clutch gear 41, so that the biasing force of the auxiliary spring 17 in the direction of retracting of the belt may be added to the subshaft 7A through the withdrawal adjusting tape 51. Thus, the device is brought into a condition as shown in FIG. 18.

(2) State where belt is withdrawn for fastening

When the occupant withdraws the belt "B" for fastening it, three members, i.e., the belt reel 3, the main shaft 2 and the subshaft 7 (hereinafter referred to collectively as the main shaft 2, etc. sometimes), are rotated in the direction of withdrawal of the belt (clockwise in FIG. 13) correspondingly, whereby the main spring 21 is more tightly rolled up through the inner end locking groove 7a of the subshaft 7A and the auxiliary spring 17 is also more tightly rolled up through the tight condition of the withdrawing adjusting tape 51. To explain conceptually, this tightly rolling-up operation corresponds to an operation of withdrawing the belt "B" to the right under the condition of FIG. 18. Thus, the seat belt "B" is withdrawn against the biasing forces of both the springs 17, 21.

Figure 19:
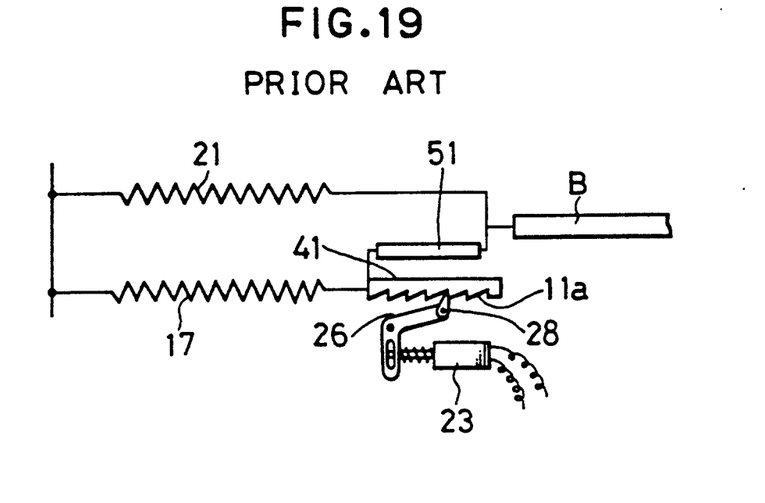
FIG. 19 is a conceptual view showing a state where a seat belt is withdrawn and its tongue is coupled with a buckle member, for explaining the operation principles of the device of FIG. 12.

When the occupant couples the tongue of the withdrawn seat belt "B" and the buckle member, the switch "S" inside the buckle member is turned on to energize the electromagnetic solenoid 23, whereby the plunger 24 is retracted to turn the pivot lever 26 in the direction of arrow H in FIG. 13. As a result, the clutch pawl 28 comes into mesh with the teeth 11a of the clutch gear 41 for locking the rotation of the gear 41 in the direction of retracting of the belt, and the biasing force of the auxiliary spring 17 in the retracting direction is held inoperative. Thus, the device is brought into a condition as shown in FIG. 19.

(3) State where belt is released from hands after coupling tongue and buckle member When the occupant couples the tongue of the belt "B"and the buckle member to each other, it is natural that the belt "B" is excessively withdrawn more than the length of the belt withdrawn in a normally fitted state. Therefore, when the occupant releases the seat belt "B" from the hands after the coupling, the belt "B" is rewound by only the biasing force of the main spring 21 until fitting over the body of the occupant, because the biasing force of the auxiliary spring 17 in the retracting direction is held inoperative.

Figure 20:
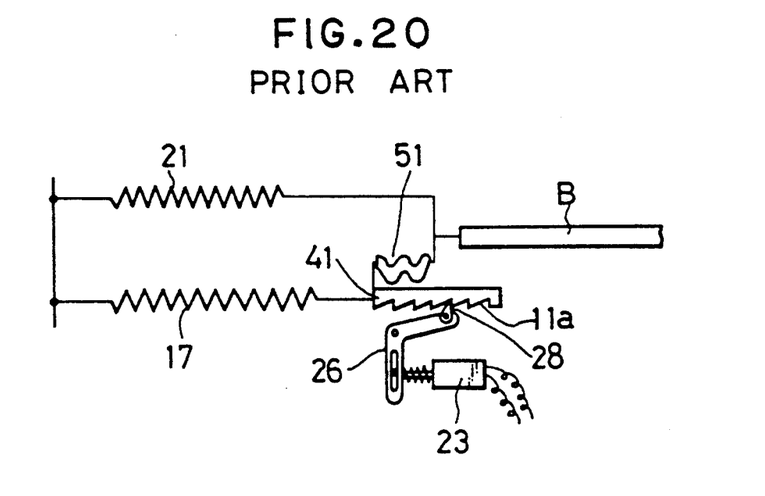
FIG. 20 is a conceptual view showing a state where after coupling between the tongue and the buckle member, the excessively withdrawn belt is somewhat rewound to fit over the body of the occupant, for explaining the operation principles of the device of FIG. 12.

On this occasion, the withdrawal adjusting tape 51 held tight between the clutch gear 41 and the subshaft 7A in the withdrawn state of the belt "B" now begins to loosen as the main shaft 2, etc. rotate counterclockwise when the belt is retracted only by the biasing force of the main spring 21. Thus, the device is brought into a condition as shown in FIG. 20 where only the biasing force of the main spring 21 is applied to the body of the occupant. As a result, the pressing that the occupant may feel can be remarkably lessened.

(4) State where the occupant moves into forwardly inclined posture after fastening belt When the occupant's posture is shifted from a normally seated posture to a forwardly inclined posture, the belt "B" is withdrawn correspondingly. At this time, until the excessive amount of belt that has been rewound after fastening the belt as mentioned above is withdrawn, the belt "B" is withdrawn while more tightly rolling up the main spring 21.

Then, at the time the excessive amount of belt rewound is fully withdrawn, the withdrawal adjusting tape 51 comes into a tight condition between the clutch gear 41 and the subshaft 7A so that the clutch gear 41 is rotated clockwise through the tight condition of the tape 51. At this time, since the teeth 11a of the clutch gear 41 moves in the forward direction with respect to the clutch pawl 28, the clutch pawl 28 will not act to prevent the rotation of the clutch gear 41. Consequently, when the seat belt "B" is withdrawn beyond the time at which the excessive amount of belt rewound has been fully withdrawn, the belt "B" is withdrawn while more tightly rolling up both the main spring 21 and the auxiliary spring 17.

(5) State where the occupant returns to normally seated posture after forwardly inclined posture When the occupant returns to a normally seated posture after taking a forwardly inclined posture, the belt "B" is retracted by only the biasing force of the main spring 21. The reason is the same as that explained before in connection with (3) "State where belt is released from hands after coupling tongue and buckle member". Thus, in this state, since the teeth 11a of the clutch gear 41 moves in the backward direction with respect to the clutch pawl 28, the rotation of the clutch gear 41 in the direction of retracting of the belt (i.e., in the counterclockwise direction) is prevented by the clutch pawl 28.

(6) State where tongue and buckle member are decoupled for alighting

When the coupling between the tongue of the seat belt "B" and the buckle member is released, the switch "S" inside the buckle member is turned off to bring the electromagnetic solenoid 23 into a de-energized state. Therefore, the plunger 24 is returned to its protruded position under the pressing force of the return spring 25 to turn the pivot lever 26 counterclockwise (i.e., in a direction opposite to the direction of arrow H), thereby releasing the engagement of the clutch pawl 28 with the teeth 11a of the clutch gear 41. As a result, the clutch gear 41 is quickly is rotated in the direction of retracting the tape (i.e., counterclockwise) by only the biasing force of the auxiliary spring 17, bringing the tape 51 into the tight condition.

Meanwhile, since the main shaft 2, etc. are always subjected to the biasing force of the main spring 21, the belt "B" is retracted around the belt reel 3 following the process explained above in connection with (1) "State where belt is stowed".

Either of the well-known seat belt retractors previously explained needs electric parts such as the buckle switch and the electromagnetic solenoid and thus is very expensive.

OBJECT AND SUMMARY OF THE INVENTION

An object of the present invention is to provide a quite reliable seat belt retractor which can hold sufficient retracting pressure when a door is open, and which does not force the occupant to feel excessive pressing when the door is closed.

Another object of the present invention is to provide a seat belt retractor which can apply biasing force to retract a seat belt from an auxiliary spring to a reel in an off-and-on way with the simple mechanism and thus reduce the production cost of the retractor.

To achieve the above objects, according to the present invention, there is provided a seat belt retractor for an automobile which comprises a reel for retracting a seat belt around the same, a frame for holding the reel in a rotatable manner, and a spring for biasing the reel in the direction of retracting of the belt, the spring being consisted of a main spring for normally biasing the reel in the direction of retracting of the belt and an auxiliary spring for producing, in the direction of retracting of the belt, biasing force that is applied to the reel in an off-and-on way by off-and-on means, the main spring and the auxiliary spring being disposed in parallel, wherein the device includes means for detecting an open/closed state of a door at the side of a seat on which the seat belt is fastened, and the off-and-on means interrupts transmission of the biasing force in the direction of retracting of the belt from the auxiliary spring to the reel when the door open/closed state detecting means detects the closed state of the door.

With the seat belt retractor of the present invention, the force of retracting the seat belt can be adjusted using neither buckle switch nor electromagnetic solenoid, making it possible to simplify the device structure.

PREFERRED EMBODIMENTS

Figure 1:
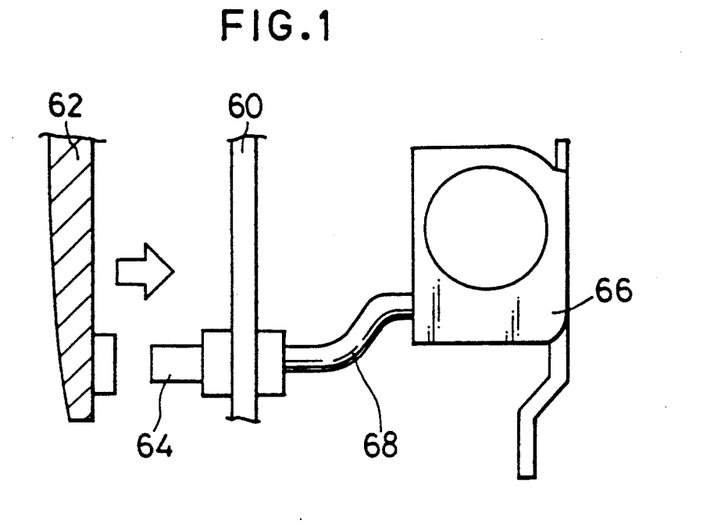
FIG. 1 is a view showing arrangement of a device according to one embodiment when loaded on a motor vehicle.

FIG. 1 is a schematic view showing an installed state of a seat belt retractor 66 according to one embodiment of the present invention. A plunger 64 is provided, as opening/closing detection means for a door 62, on a pillar 60 of an automobile in such a manner as to be able to move back and forth in the direction of opening/closing of the door. The retractor 66 includes a spring 65 for normally biasing the plunger 64 in the direction of protrusion thereof. The rear end of the plunger 64 is connected to the fore end of a wire 74 of a wire unit 68 and, as described later, a pivot lever 82 provided in the seat belt retractor 66 is driven when the wire is retracted.

Figure 2:
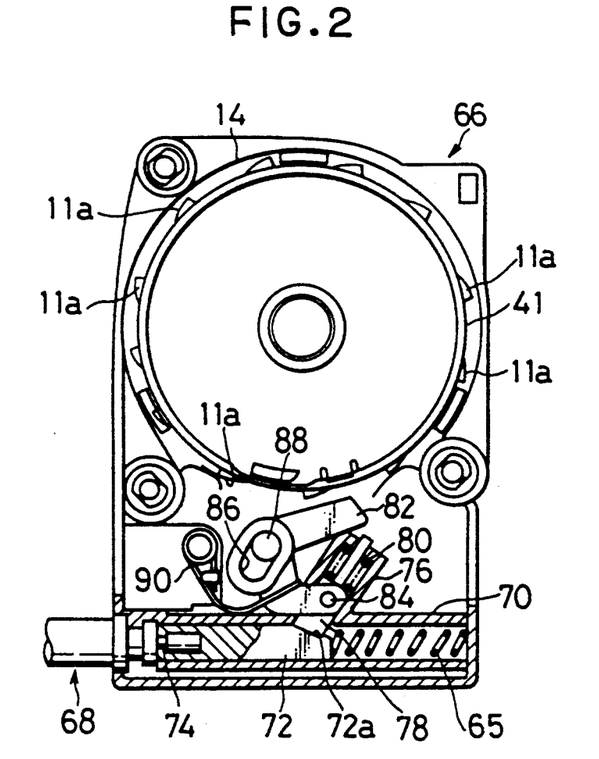
FIG. 2 is a sectional view of principal parts of the device according to one embodiment.
Figure 3:
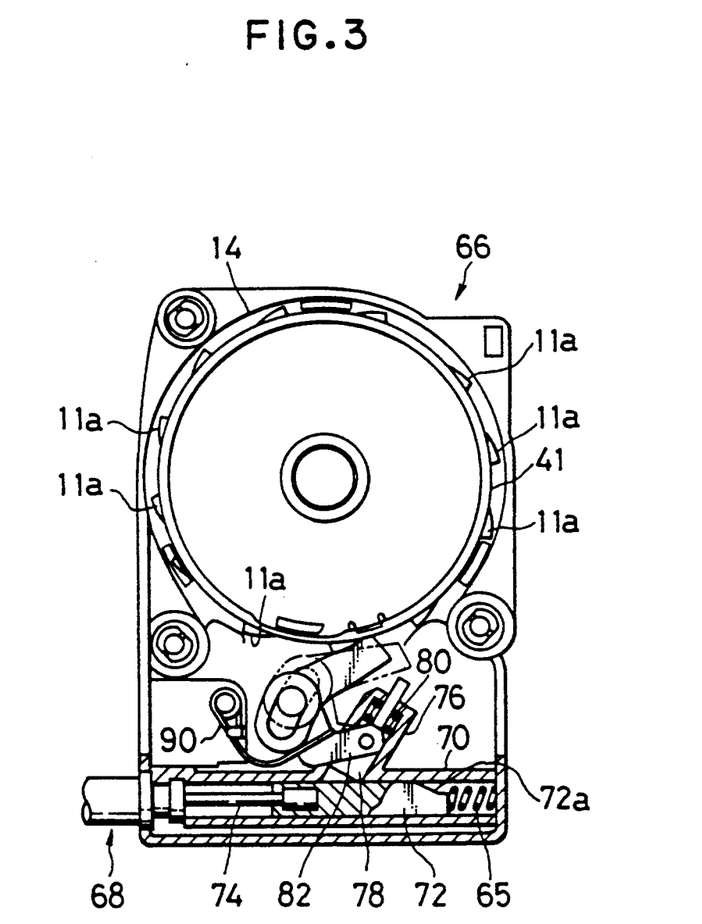
FIG. 3 is a sectional view of principal parts of the device according to one embodiment.

More specifically, as shown in FIGS. 2 and 3, the seat belt retractor 66 includes a guide column 70 and a slider 72 slidably fitted in the guide column 70. The wire 74 of the wire unit 68 is connected to the rear end of the slider 72. A sloped surface 72a is formed at the fore end of the slider 72.

A piston column 76 is obliquely coupled with the guide column 70, and a piston 78 is slidably inserted in the piston column 76.

The piston 78 is normally biased from the rear (upper) end by the spring 80 so that the fore (lower) end of the piston 78 is held in abutment with the slider 72. The rear (lower) end of the pivot lever 82 is pivotally supported to the piston 78 by a pin 84. A loose hole 86 is bored in the central portion of the pivot lever 82, and the pivot lever 82 is supported by a pin 88 to a retainer 4 of the seat belt retractor through the loose hole 86. The fore (upper) end of the pivot lever 82 is engageable with teeth 11a of a clutch gear 41. Additionally, the pivot lever 82 is normally biased by a spring 90 so that its upper end is kept away from the teeth 11a.

The internal structure of the seat belt retractor is the same as that shown in FIGS. 12 to 20 except that the pivot lever 26 is replaced with the pivot lever 82 and the electromagnetic solenoid 23 is dispensed with correspondingly.

In the seat belt retractor thus constructed, when the door 62 is open, the plunger 64 is protruded and the slider 72 is in its retracted limit position as shown in FIG. 2. Under this condition, since the piston 78 is in its lower limit position while abutting with the sloped surface 72a, the upper end of the pivot lever 82 is kept away from the teeth 11a. Accordingly, a seat belt "B" is given by the two springs 17, 21 strong forces of retracting it around the reel 3.

When the door 62 is closed, the plunger 64 is pushed back by the door 62 to advance the slider 72 as shown in FIG. 3. The piston 78 is thereby pushed up so that the upper end of the pivot lever 82 comes into engagement with a tooth 11a of the clutch gear 41. As a result, the seat belt "B" is now retracted by only the biasing force of the main spring 21.

Thus, when a driver decouples the seat belt and opens the door after driving, for example, the seat belt is strongly rewound. On the other hand, when the driver gets on an automobile and closes the door, the force of retracting up the seat belt is reduced to such an extent that the belt is fitted over the driver's body with appropriately weak force, enabling the driver to have a comfortable feeling during the driving.

Figure 4:
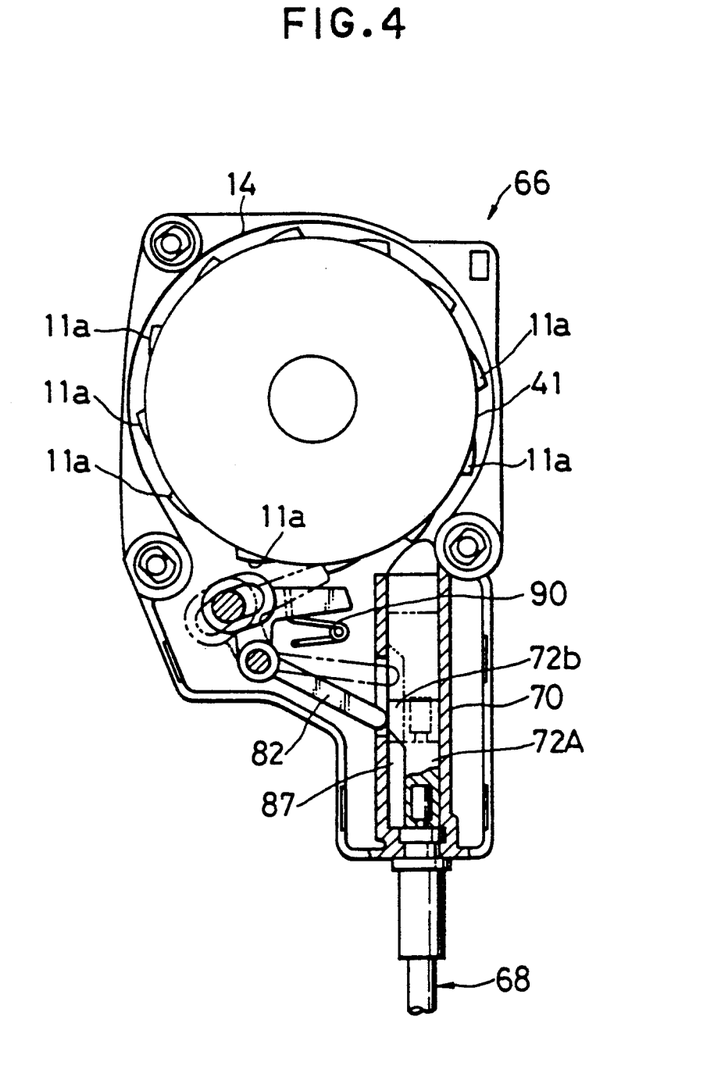
FIG. 4 is a sectional view of principal parts of the device according to another embodiment.

FIG. 4 shows another embodiment of the present invention in which the guide column 70 is installed vertically. A slider 72A inserted in the guide column 70 is provided with a groove (recess) 87 extending from the rear (lower) end to a position near the fore (upper) end thereof. When the door is closed, as indicated by two-dot-chain lines in FIG. 4, the slider 72A is pushed up so that the lower end of the pivot lever 82 enters the groove 87 and the upper end of the pivot lever 82 comes into engagement with one tooth 11a of the clutch gear 41. When the door is opened, the slider 72A is descended and the lower end of the pivot lever 82 is pushed by a land 72b of the slider 72A, whereby the upper end of the pivot lever 82 is disengaged from the teeth 11a.

With the embodiment of FIG. 4, too, when the door is opened, the seat belt is given the strong retracting forces by both the main spring 21 and the auxiliary spring 17. On the other hand, when the door is closed, the appropriately weak retracting force is applied to the seat belt "B".

While the foregoing embodiments are both concerned with an improvement in the seat belt retractor of the structure shown in FIGS. 12 to 20, the similar retracting adjusting mechanism in cooperation with opening/closing of the door may be incorporated in the seat belt retractor shown in FIGS. 5 to 11.

What is claimed is:

1. A seat belt retractor comprising:
   a reel for retracting a seat belt therearound;
   a frame for holding said reel in a rotatable manner;
   a main spring for normally biasing said reel in a direction of retracting said belt;
   an auxiliary spring disposed parallel to said main spring for producing a biasing force in the direction of retracting said belt;
   means for detecting an open/closed state of a door at a side of a seat on which said seat belt is fastened,
   off-and-on means for applying said biasing force to said reel in an off-and-on way, said off-and-on means interrupting transmission of the biasing force from said auxiliary spring to said reel when said door open/closed state detecting means detects a closed state of said door and transmitting the biasing force from said auxiliary spring to said reel when said door open/closed state detecting means detects an open state of said door, said off-and-on means including:
   a slider having a rear end connected to the detecting means and capable of shifting over a stroke in response to a back-and-forth movement of said detecting means;
   a sloped surface formed at a fore end of said slider and extending in a direction transversal to a direction in which said slider moves back and forth;
   a piston provided to be movable back and forth in a direction substantially vertical to the sloped surface of said slider, said piston being able to selectively take an advanced state where a fore end of said piston is abutted with the sloped surface of said slider, and a retreated state where the fore end of said piston is abutted with a side surface of said slider, and
   biasing means for biasing said piston in a direction to the advanced state of said piston
   so that when said detecting means detects the open state, said slider is moved back and the fore end of said piston is abutted with the sloped surface of said slider to allow said piston to advance, and when said detecting means detects the closed state, said detecting means pushes said slider to move forth so that said piston is retreated by being pushed by the sloped surface of said slider and the fore end of said piston is finally abutted with the side surface of said slider, thereby shifting said piston to a most retreated position.

2. A seat belt retractor according to claim 1, wherein said door open/closed state detecting means comprises:
   a plunger to be able to protrude from a door opening edge against which an automobile door hits when closed, and to retract therefrom by being pushed by said door when closed;
   biasing means for biasing said plunger in the direction of protrusion of said plunger; and
   means for transmitting the movement of protrusion and retraction of said plunger to said off-and-on means.

3. A seat belt retractor according to claim 2, wherein said means for transmitting the movement of said plunger of said off-and-on means comprises a wire having one end connected to said plunger and the other end movable back-and-forth in response to the movement of protrusion and retraction of said plunger.

4. A seat belt retractor according to claim 1, wherein a pivot lever is pivotally supported at one end to said piston and, when said piston is moved back and forth, the other end of said pivot lever is swung so that the other end of said pivot lever controls transmission of the biasing force in the direction of retracting said belt from said auxiliary spring to said reel in an off-and-on manner.

5. A seat belt retractor according to claim 1, further comprising:
   a clutch gear connected to one end of said auxiliary spring and having teeth on a circumference thereof;
   a pivot lever having a rear end pivoted to said piston and rotatable between an advanced position where a fore end of said pivot lever engages a tooth of said clutch gear to thereby interrupt transmission of said biasing force produced by said auxiliary spring and a retreated position where said fore end of said pivot lever disengages teeth of said clutch gear to thereby allow transmission of said biasing force from said auxiliary spring to said reel, thus providing said seat belt with a large retracting force; and
   a spring for biasing said pivot lever towards said retreated position so that when the door is closed, said pivot lever is rotated by said piston so that said fore end of said pivot lever engages a tooth of said clutch gear to thereby interrupt transmission of said biasing force caused by said auxiliary spring, thus providing said seat belt with a comfortably reduced retracting force.

6. A seat belt retractor comprising:

a reel for retracting a seat belt therearound;

a frame for holding said reel in a rotatable manner;

a main spring for normally biasing said reel in a direction of retracting said belt;

an auxiliary spring disposed parallel to said main spring for producing a biasing force in the direction of retracting said belt;

means for detecting an open/closed state of a door at a side of a seat on which said seat belt is fastened;

off-and-on means for applying said biasing force to said reel in an off-and-on way, said off-and-on means interrupting transmission of the biasing force from said auxiliary spring to said reel when said door open/closed state detecting means detects a closed state of said door, and said off-and-on means transmitting the biasing force from said auxiliary spring to said reel when said door open/closed state detecting means detects an open state of said door, said off-and-on means including:

a slider connected to the detecting means to be able to shift over a stroke in response to a back-and-forth movement of said detecting means;

a recess and a land both provided on a side surface of said slider and being disposed adjacent to each other in a direction of stroke of said slider;

a pivot lever rotatable between an advanced state where a fore end of said pivot lever is engaged in the recess of said slider, and a retreated state where the fore end of said pivot lever is abutted with the land of said slider, and biasing means for biasing said pivot lever in a direction to said advanced state of said pivot lever so that when said detecting means detects a change from the open state to the closed state, said slider is moved back and the fore end of said pivot lever is engaged in the recess of said slider to advance the pivot lever, and when said detecting means detects a change from the closed state to the open state, said slider is moved so that the fore end of said pivot lever is abutted on the land of said slider, thereby rotating said pivot lever to a most retreated position.

7. A seat belt retractor according to claim 5, wherein said door open/closed state detecting means comprises a plunger able to protrude from a door opening edge against which an automobile door hits when closed and to retract therefrom by being pushed by said door when closed and a wire having one end connected to said plunger for transmitting protrusion and retraction movement of said plunger to said off-and-on means.

8. A seat belt retractor according to claim 7, further comprising a guide column vertically arranged in the frame for slidably receiving the slider therein and having a side opening for allowing the fore end of said pivot lever to always abut against one of the recess and the land within the opening.

* * * * *